(12) United States Patent
Narita et al.

(10) Patent No.: US 6,504,565 B1
(45) Date of Patent: Jan. 7, 2003

(54) LIGHT-EMITTING DEVICE, EXPOSURE DEVICE, AND IMAGE FORMING APPARATUS

(75) Inventors: Izumi Narita, Shizuoka-ken (JP); Noboru Koumura, Ushiku (JP); Yukio Nagase, Tokyo (JP); Seiji Mashimo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/396,461

(22) Filed: Sep. 15, 1999

(30) Foreign Application Priority Data

Sep. 21, 1998 (JP) ............................................ 10-265905
Sep. 21, 1998 (JP) ............................................ 10-265906

(51) Int. Cl.$^7$ ................................................. B41J 2/435

(52) U.S. Cl. ....................................... 347/237; 347/247

(58) Field of Search ................................ 347/233, 237, 347/238, 236, 130, 118, 133, 132, 247, 252, 194, 246; 428/690

(56) References Cited

U.S. PATENT DOCUMENTS

| | | | | |
|---|---|---|---|---|
| 4,799,071 A | * | 1/1989 | Zeise et al. | 347/233 |
| 4,982,203 A | * | 1/1991 | Uebbing et al. | 347/236 |
| 5,600,363 A | * | 2/1997 | Anzaki et al. | 347/237 |
| 5,668,587 A | * | 9/1997 | Hammond et al. | 347/237 |
| 5,825,399 A | * | 10/1998 | Orlicki et al. | 347/237 |
| 6,030,715 A | * | 2/2000 | Thompson et al. | 428/690 |
| 6,130,700 A | * | 10/2000 | Murayama et al. | 347/240 |

* cited by examiner

*Primary Examiner*—Hai Pham
(74) *Attorney, Agent, or Firm*—Fitzpatrick, Cella, Harper & Scinto

(57) ABSTRACT

A light-emitting device is disclosed which includes a light-emitting element array formed by arranging a plurality of light-emitting elements, a driving unit for driving the light-emitting element array to emit light from each of the light-emitting elements, a memory unit for storing the number of light emissions for each light-emitting element of the light-emitting element array, and a control unit for controlling the driving unit based on the information stored in the memory unit so that the amount of light emitted from each light-emitting element is held constant. An exposure device employing the light-emitting device, and an image forming apparatus employing the exposure device are also disclosed.

28 Claims, 7 Drawing Sheets

LIGHT-EMITTING DEVICE, EXPOSURE DEVICE, AND IMAGE FORMING APPARATUS

BACKGROUND OF THE INVENTION

1. Field of the Invention

The present invention relates to a light-emitting device, an exposure device, and an image forming apparatus. More particularly, the present invention relates to an exposure device which serves as a light source for exposing a photoconductive member in an apparatus utilizing the electrophotographic process, and an image forming apparatus employing the exposure device.

2. Description of the Related Art

The electrophotographic process is, as is well known, a process comprising the steps of exposing an image onto a photoconductive member, developing the image with a toner, transferring a toner image onto a transfer material (paper), fusing a transferred image, and then cleaning the photoconductive member. The electrophotographic process is utilized in many image forming apparatuses.

In such an image forming apparatus, a laser optical system for scanning a laser beam with a polygon mirror is widely employed as an exposure unit for writing a latent image onto the surface of a photoconductive member because the laser optical system has a high resolution and a high scanning speed. However, the laser optical system has problems in that difficulties are encountered in reducing the unit size because a space to accommodate optical parts such as a polygon mirror and lenses is required, and in realizing a superhigh speed because a laser beam is dynamically scanned with rotation of the polygon mirror.

For that reason, attention has been focused on an LED (light-emitting diode) array in which a plurality of LEDs formed of GaAsP, GaAlAs or the like are set into an array. The LED array has been increasingly applied to exposure units for use with the electrophotographic process because the LED array is a linear light-emitting unit and performs static scanning with a simpler optical system.

Further, another linear light-emitting array has been proposed in which array elements are formed at a time using organic or inorganic light-emitting elements. An array of light-emitting elements is collectively formed, for example, by stacking a transparent anode layer, an organic compound layer, and a cathode layer on a long belt-shaped light permeable base plate such that the belt-shaped organic compound layer is held between both the electrode layers having predetermined patterns from the front and the back, thus enabling the individual light-emitting elements to emit light independently of one another.

However, the light-emitting element array, and in particular, the light-emitting element array employing organic light-emitting elements, has a problem in that the amounts of light emitted from the light-emitting elements are reduced due to temperature changes depending on successive light emissions.

In the LED array using a plurality of LEDs and the linear light-emitting element array in which array elements are formed at a time using organic or inorganic light-emitting elements, because a number of light-emitting elements are arranged, the light-emitting elements of the array have individual differences in characteristics and do not have the same light-amount characteristics. Thus, there has been a problem that even with the light-emitting elements driven at the same level, light emission outputs of the elements slightly differ from one another and the amounts of light emitted from the elements vary to some extent.

As a consequence, when applied to exposure units for use with the electrophotographic process, variations in the amounts of light emitted from the light-emitting elements give rise to unevenness in exposure and hence unevenness in density of the formed image, whereby image quality is deteriorated.

SUMMARY OF THE INVENTION

In view of the above problems experienced in the related art, an object of the present invention is to provide a light-emitting device, an exposure device, and an image forming apparatus which can compensate for and changes in the amount of light attributable to temperature changes depending on successive light emissions.

According to a first aspect, the present invention provides a light-emitting device comprising a light-emitting element array formed by arranging a plurality of light-emitting elements, driving means for driving the light-emitting element array to emit light from each of the light-emitting elements, memory means for storing the number of light emissions for each light-emitting element of the light-emitting element array, and control means for controlling the driving means based on the information stored in the memory means so that the amount of light emitted from each light-emitting element is held constant. According to the first aspect, the present invention also provides an exposure device employing the light-emitting device, and an image forming apparatus employing the exposure device.

According to a second aspect, the present invention provides a light-emitting device comprising a light-emitting element array formed by arranging a plurality of light-emitting elements, driving means for driving the light-emitting element array to emit light from each of the light-emitting elements, memory means for storing a total light-emitting time for each light-emitting element of the light-emitting element array, and control means for controlling the driving means based on the information stored in the memory means so that the amount of light emitted from each light-emitting element is held constant. According to the second aspect, the present invention also provides an exposure device employing the light-emitting device, and an image forming apparatus employing the exposure device.

DESCRIPTION OF THE PREFERRED EMBODIMENTS

Embodiments of a light-emitting device, an exposure device, and an image forming apparatus according to the present invention will be described below with reference to the accompanying drawings.

Figure 1:
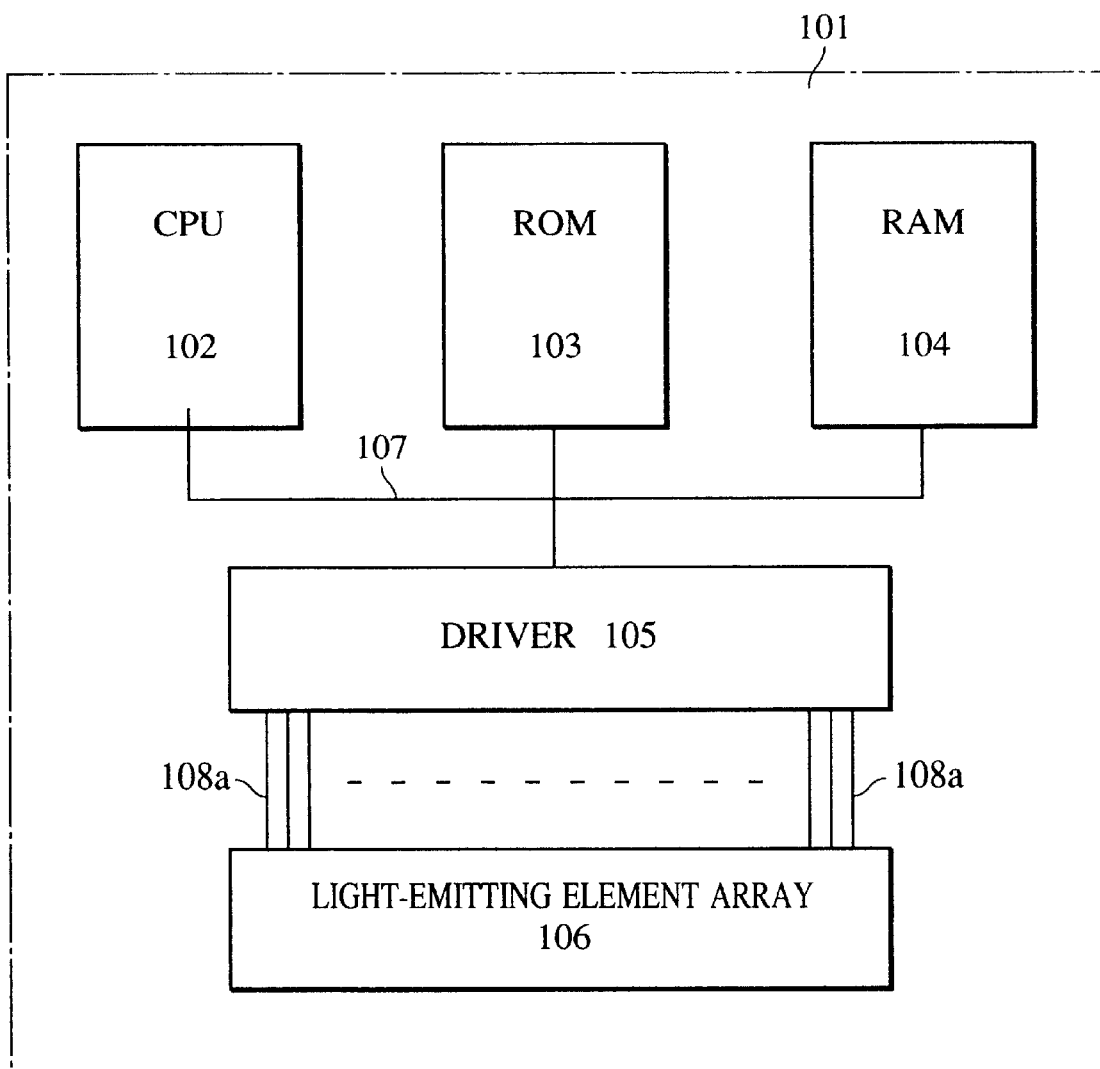
FIG. 1 is a block diagram of an exposure device, showing a first embodiment of the present invention.
Figure 2:
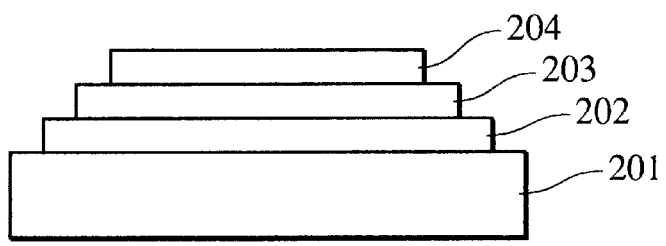
FIG. 2 is a sectional view of a light-emitting element array in FIG. 1.
Figure 3:
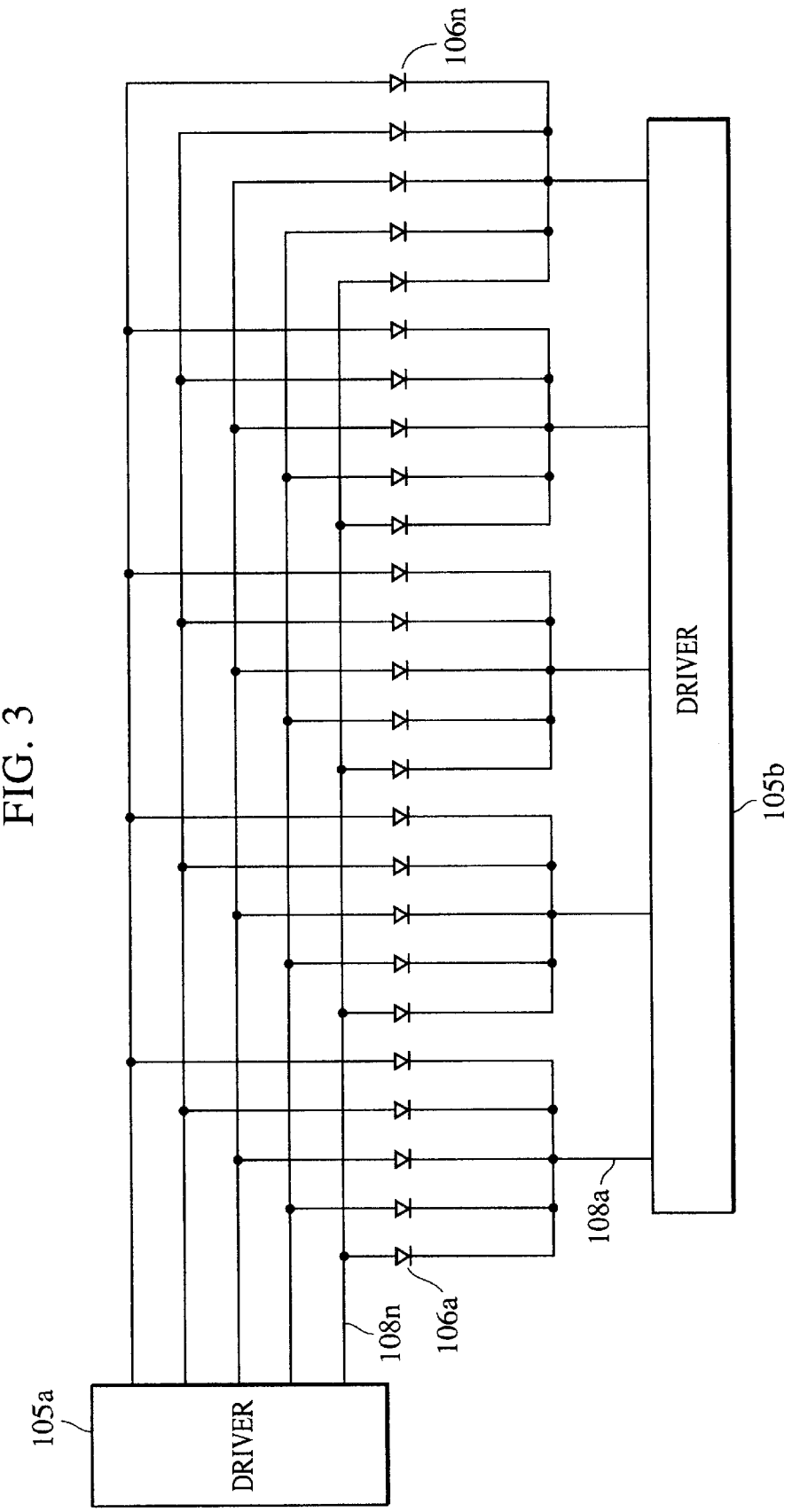
FIG. 3 shows, in more detail, the light-emitting element array and a driver in FIG. 1.

FIGS. 1 to 3 illustrate a first embodiment of the present invention. FIG. 1 is a block diagram of an exposure device according to the present invention, FIG. 2 is a sectional view of a light-emitting element array in FIG. 1, and FIG. 3 shows, in more detail, the light-emitting element array and a driver in FIG. 1.

An exposure device 101 comprises a CPU 102, a ROM 103, a RAM 104, a driver 105, and a light-emitting element array 106. More specifically, the CPU 102, the ROM 103, the RAM 104, and the driver 105 are interconnected by a control line 107. The CPU 102 taking in image data transmits various data, addresses, etc. to the respective components. The driver 105 and the light-emitting element array 106 are interconnected by a plurality of driving lines 108a–108n so that driving signals corresponding to the image data are transmitted to the light-emitting element array 106.

The light-emitting element array 106 comprises the so-called organic light-emitting elements and is formed, as shown in FIG. 2, by stacking a transparent anode layer 202, an organic compound layer 203, and a cathode layer 204 on a long belt-shaped light permeable base plate 201 in the order named. The belt-shaped organic compound layer 203 is held between the electrode layers 202 and 204 having predetermined patterns from the front and the back so that individual elements of the light-emitting element array are formed at a time and emit light independently of one another.

It is to be noted that light-emitting elements for use in the present invention are not particularly limited to organic light-emitting elements. For example, the light-emitting element array may comprise inorganic light-emitting elements. However, the light-emitting element array is preferably made up of at least the anode layer 202, the cathode layer 204, and one or more organic compound layers 203 held between them, all of these three layers being stacked on the light permeable base plate 201, as described above.

The base plate 201 can be formed of any type of plate so long as it is able to support the light-emitting elements on the surface. A transparent insulating base plate formed of glass such as soda lime glass or a resin film, for example, is preferably employed.

The anode layer 202 is preferably made of a material having a great work function, and such a material can be selected from among, e.g., ITO, tin oxide, gold, platinum, palladium, selenium, iridium, and copper iodide. On the other hand, the cathode layer 204 is preferably made of a material having a small work function, and such a material can be selected from among, e.g., Mg/Ag, Mg, Al, In, or any alloy of these elements.

The organic compound layer 203 may be of a single- or multi-layer structure. For example, the organic compound layers 203 is made up of a positive hole transporting layer into which positive holes are injected from the anode layer 202, and an electron transporting layer into which electrons are injected from the cathode layer 204, one of the positive hole transporting layer and the electron transporting layer serving as a light emitting layer. As another example, a fluorescent layer containing a fluorescent substance may be interposed between the positive hole transporting layer and the electron transporting layer. As still another example, the organic compound layer 203 may comprise a mixed single layer which serves as the positive hole transporting layer, the electron transporting layer, and the fluorescent layer concurrently.

The positive hole transporting layer can be made of, e.g., N,N'-bis(3-methylphenyl)-N,N'-diphenyl-(1,1'- biphenyl)-4, 4'-diamine (hereinafter referred to as TPD). Other examples of usable organic materials are as follows.

Hole Transporting Compounds
Hole Transporters

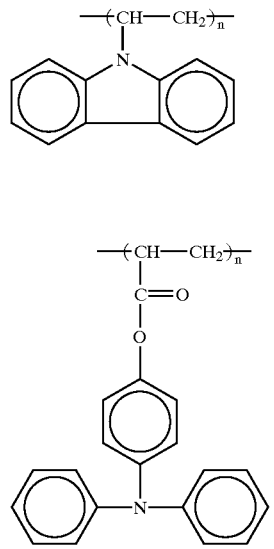

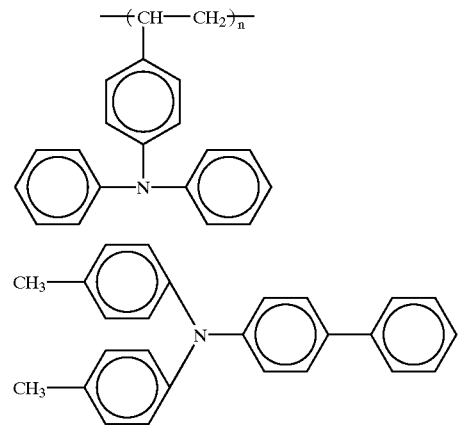

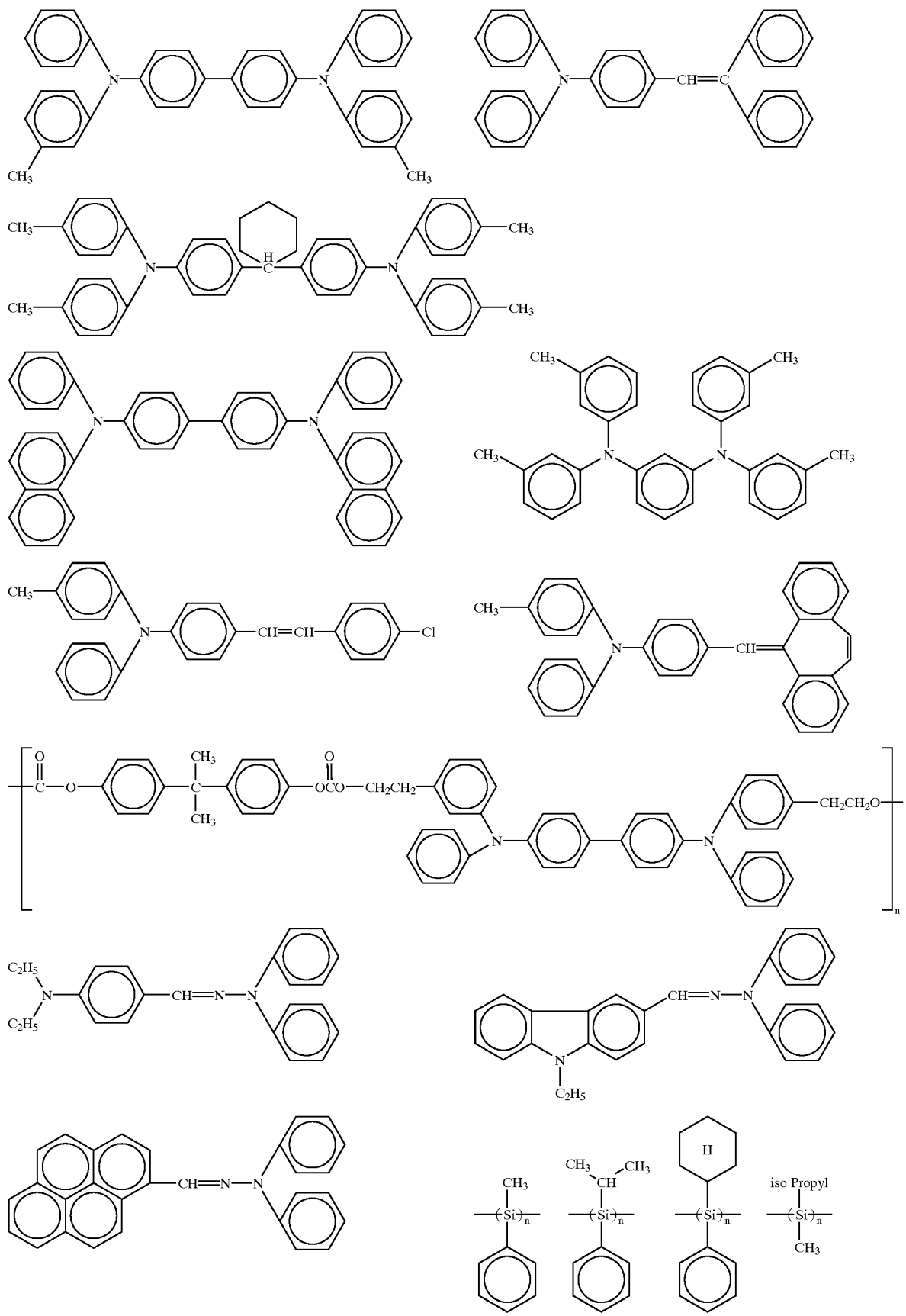

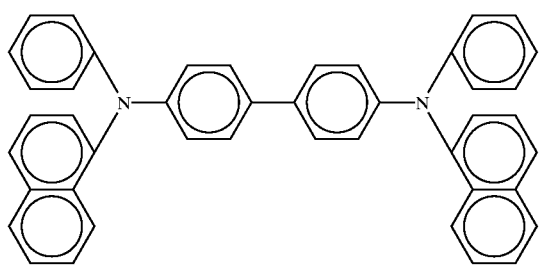
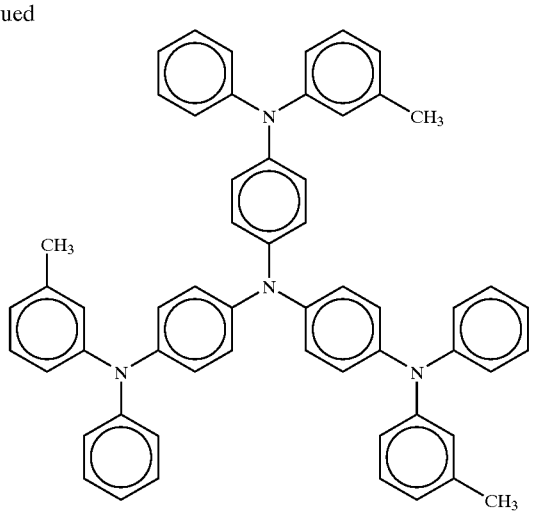
Alternatively, the positive hole transporting layer may be made of an inorganic material such as a-Si or a-SiC, for example.
The electron transporting layer can be made of, e.g., tris(8-quinolinol)aluminum (hereinafter referred to as Alq$_3$). Other examples of usable materials are as follows.
Electron Transporting Compounds
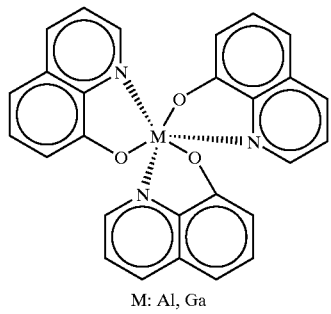
M: Al, Ga
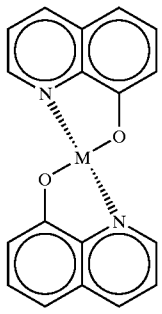
M: Zn, Mg, Be
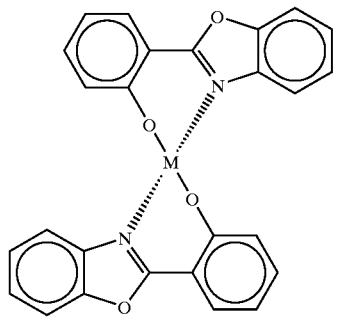
M: Zn, Mg, Be
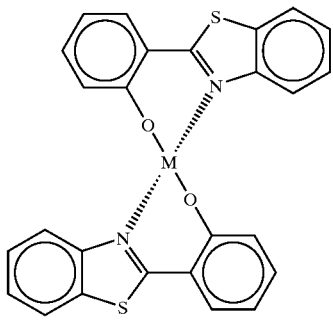
M: Zn, Mg, Be
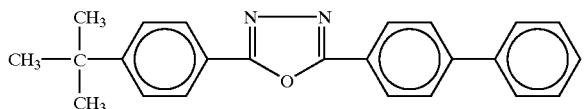
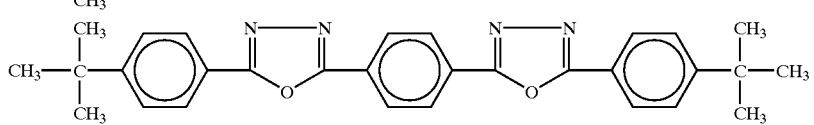

-continued
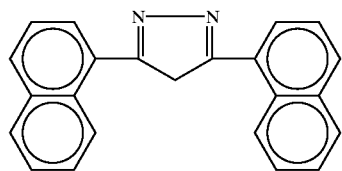
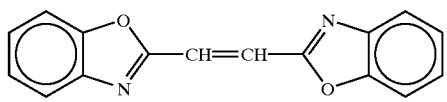
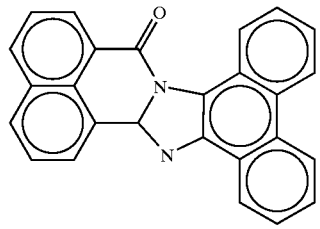
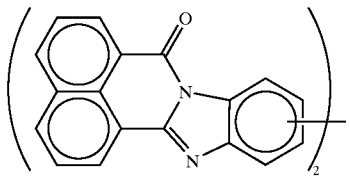
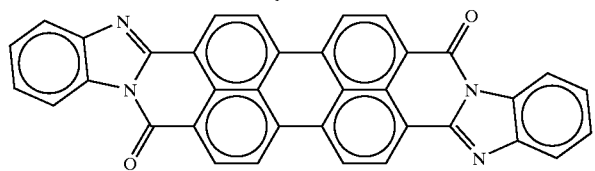
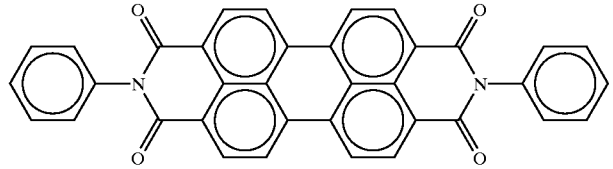
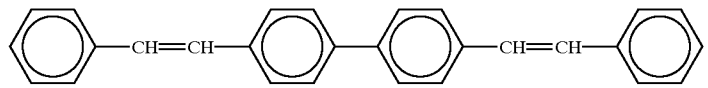
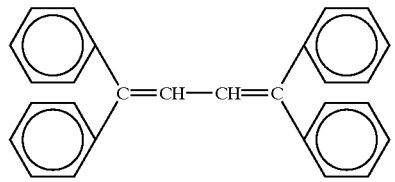
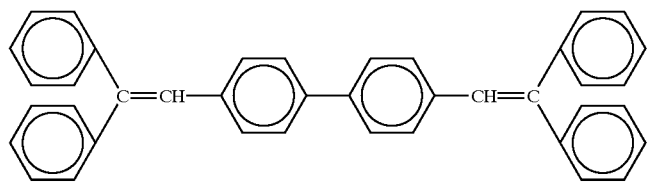
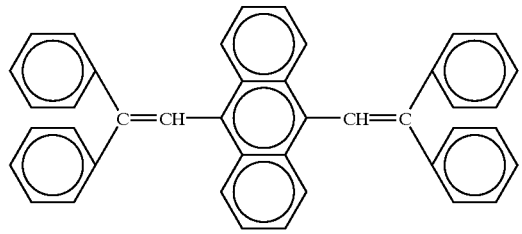
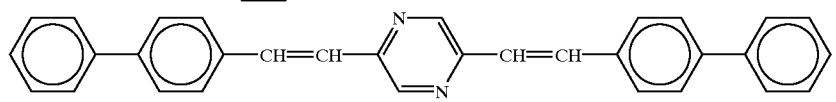
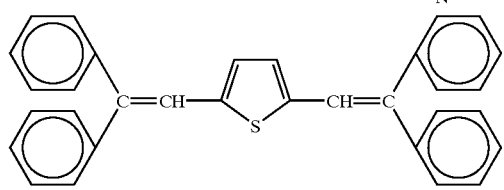

Further, any of the following dopant dyes can be doped in the electron transporting layer or the positive hole transporting layer.

Dopant Dyes

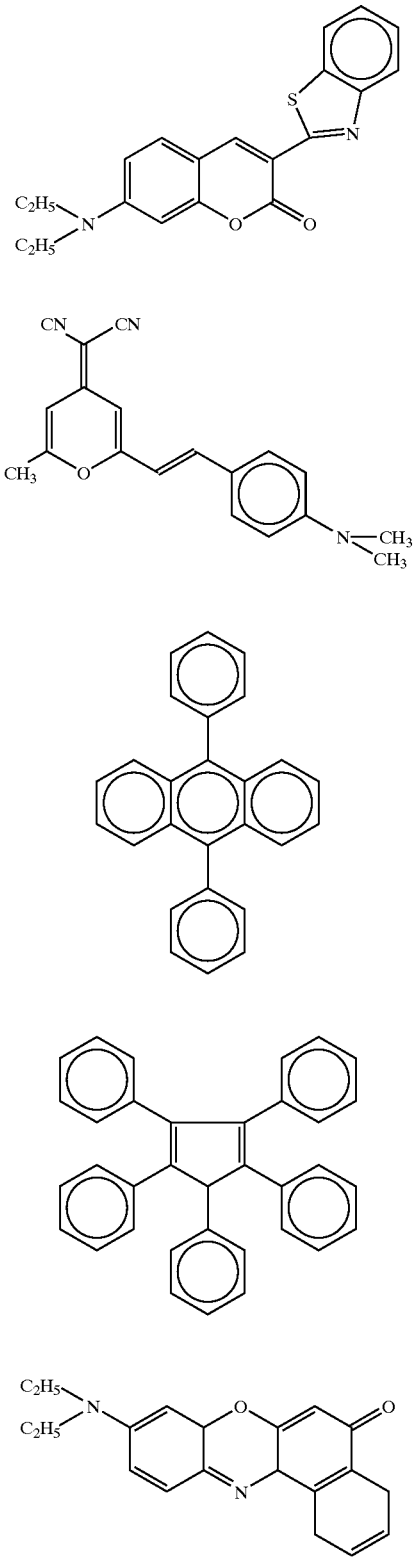

-continued

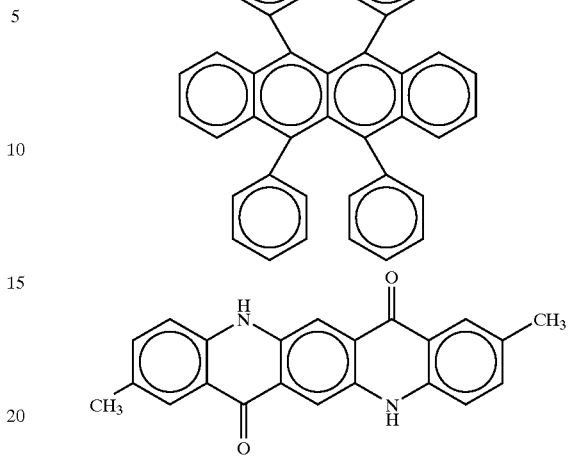

In addition, it is preferable that a dielectric layer be interposed between the anode layer 202 and the base plate 201. By forming the dielectric layer of multiple layers, e.g., $SiO_2$ and SiO, having different indexes of refraction and stacked one above another, the reflectivity or transmissivity of the array can be increased or decreased for a particular range of wavelength. As an alternative, a simple half-mirror may be interposed between the anode layer 202 and the base plate 201.

As shown in FIG. 3, light-emitting elements 106a–106n of the light-emitting element array 106 are connected at the anode side to a driver 105a and at the cathode side to a driver 105b. The light-emitting elements 106a–106n are selectively driven by the drivers 105a and 105b.

In the exposure device 101, image data is taken into the CPU 102 which transmits control signals corresponding to the image data to the driver 105 via the control line 107 in a proper manner. When causing the light-emitting element 106a to emit light, for example, the driving line 108n on the side of the driver 105a and the driving line 108a on the side of the driver 105b are both made active, whereby the light-emitting element 106a is selected and driven to emit light.

Figure 4:
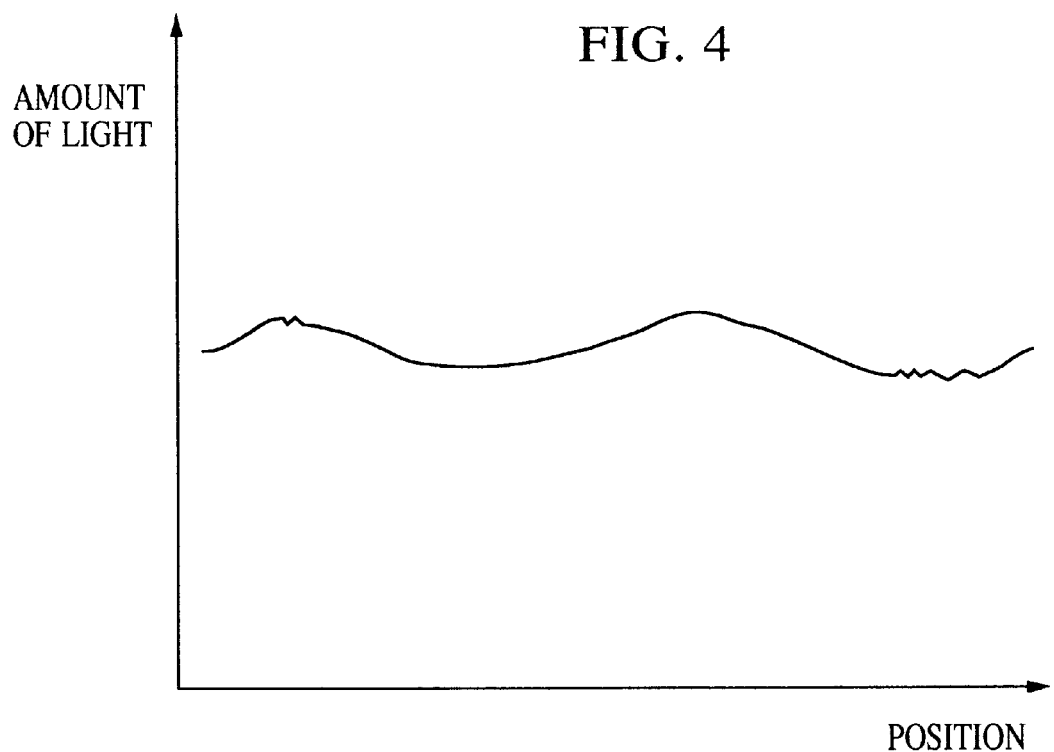
FIG. 4 is a graph showing variations in the amounts of light emitted from respective light-emitting elements arranged into the light-emitting element array.

Even when supplied with driving signals having the same level, the light-emitting elements 106a–106n of the light-emitting element array 106 produce light emission outputs slightly different from one another, and the amounts of emitted light vary depending on the positions of the array elements (i.e., the light-emitting elements 106a–106n), as shown in FIG. 4. Such variations in the amounts of light are stored in the ROM 103 beforehand, and the CPU 102 performs correction control by reading the stored data from the ROM 103. Stated otherwise, the CPU 102 performs control to properly increase and decrease the pulse widths of the driving signals in accordance with the light-amount data specific to the light-emitting elements 106a–106n. For this purpose, the driving times for the individual elements are prolonged and shortened so as to cancel out deviations among them. As a result, the variations in the amounts of light emitted from the light-emitting elements 106a–106n at the initial point can be compensated.

Figure 5:
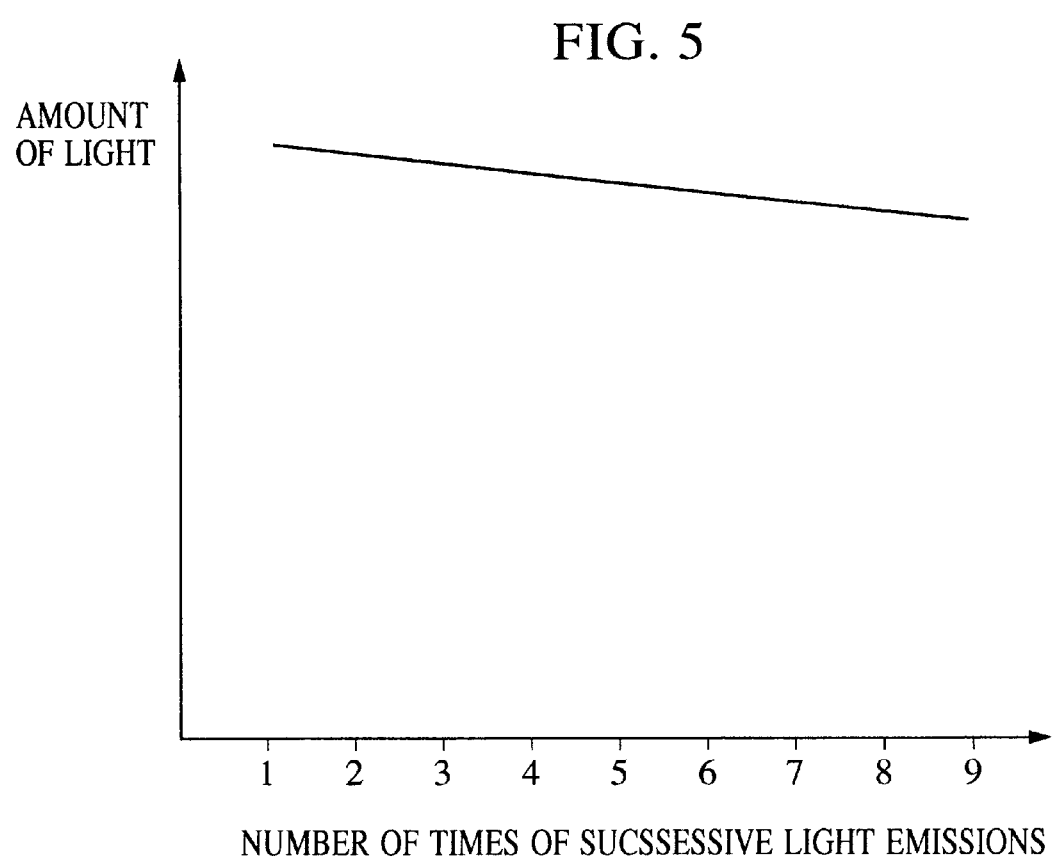
FIG. 5 is a graph showing the correlation between the number of times of successive light emissions and the amount of light from the light-emitting element.
Figure 6:
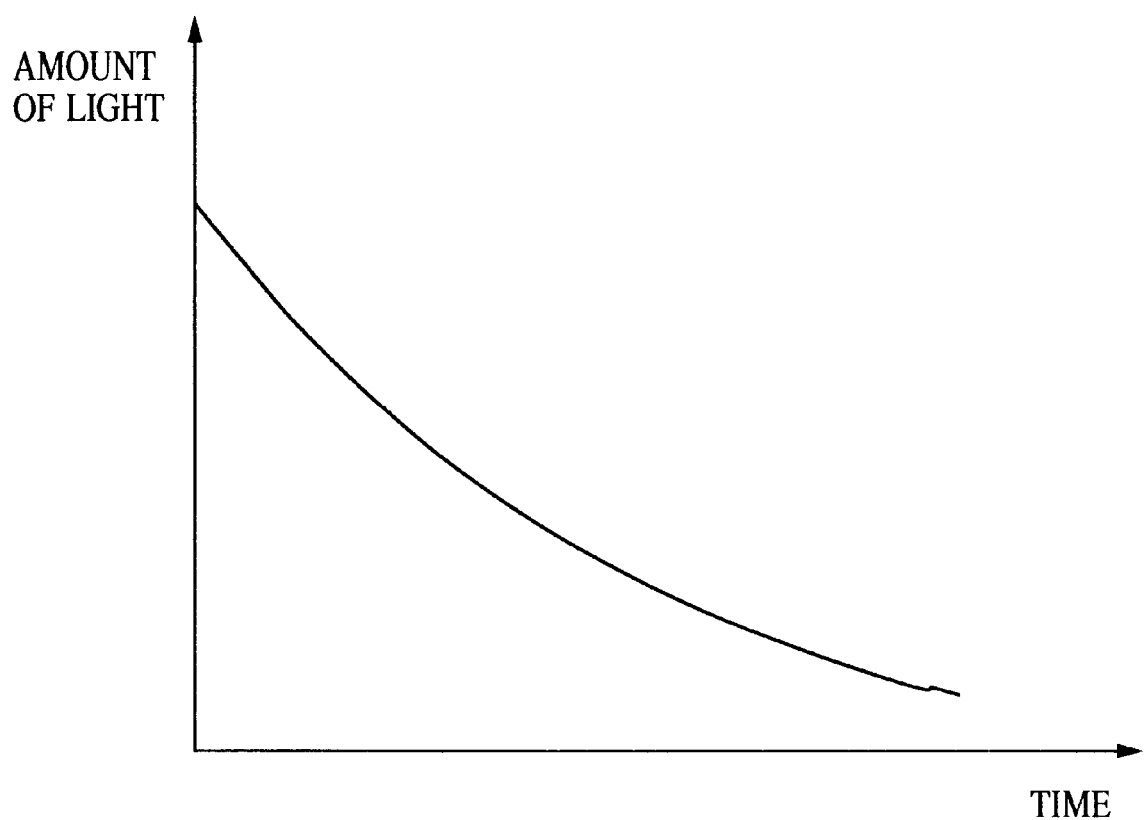
FIG. 6 is a graph showing the correlation between the layer driving time of the light-emitting element and the amount of light therefrom.

The temperature of the light-emitting elements 106a–106n of the light-emitting element array 106 increases with successive light emissions. As shown in FIG. 5, therefore, successive light emissions lower the amount of light emitted from each element and deteriorate image quality. In view of such a tendency, the CPU 102 stores in the RAM 104 light-amount variation patterns depending on the number of successive light emissions from the light-emitting elements 106a–106n and temperature changes thereof. At the time of driving the individual elements to emit light in a next cycle, the CPU 102 performs control to properly increase the pulse widths of the driving signals based on the stored light-amount variation patterns so that the driving times are prolonged to compensate reductions in the amounts of light. As a result, each light-emitting element is adaptable for temperature changes depending on the successive light emissions, and can emit light in the predetermined amount. Moreover, since the temperature of each light-emitting element is also increased incidental to light emissions from the adjacent elements, such a temperature change is further stored in the RAM 104 and subjected to correction control in a like manner, thus ensuring that the predetermined amount of light is emitted from each light-emitting element.

With the thus-constructed exposure device 101 of this embodiment, the light-amount characteristics of the light-emitting elements 106a–106n of the light-emitting element array 106 are stored in the ROM 103 and the RAM 104, and the CPU 102 performs correction control for the light-emitting elements 106a–106n based on the stored data so that the amount of light emitted from each element is kept constant. In other words, the pulse widths of the driving signals for the light-emitting elements are properly increased and decreased to change the driving times, thereby compensating variations in the amounts of light. Since the light-amount characteristics stored in the ROM 103 and the RAM 104 include data about initial variations in the amounts of light and data about reductions in the amounts of light caused by temperature changes, the changes in the amounts of light caused by temperature changes and the variations in the amounts of light depending on the individual elements of the array can be compensated with the correction control based on those light-amount characteristics. Accordingly, the light-emitting element array can be suitably applied to exposure units for use with the electrophotographic process.

In addition, the light-emitting elements 106a–106n of the light-emitting element array 106 undergo the so-called time-dependent changes, and show such a negative correlation characteristic that the amount of light emitted from each element is remarkably reduced with the accumulation of time during which the light-emitting element is driven to emit light. Such a light-amount characteristic with regard to the accumulated driving time is also stored in the form of table data in the ROM 103 beforehand, and the CPU 102 counts the accumulated driving time for each of the light-emitting elements 106a–106n. Then, the CPU 102 compares the accumulated driving time with the table data stored in the ROM 103 to calculate a correction amount, and performs control to properly increase the pulse width of the driving signal so that the driving time is increased to compensate a reduction in the amount of light. As a result, each light-emitting element is adaptable for time-dependent changes, and can emit light in the predetermined amount.

With the thus-constructed exposure device 101 of this embodiment, the light-amount characteristics of the light-emitting elements 106a–106n of the light-emitting element array 106 are stored in the ROM 103 and the RAM 104, and the CPU 102 performs correction control for the light-emitting to elements 106a–106n based on the stored data so that the amount of light emitted from each element is kept constant. In other words, the pulse widths of the driving signals for the light-emitting elements are properly increased and decreased to change the driving times, thereby compensating variations in the amounts of light. Since the light-amount characteristics stored in the ROM 103 and the RAM 104 include data about initial variations in the amounts of light and data about reductions in the amounts of light depending on the total driving times, the changes in the amounts of light depending on the total driving times and the variations in the amounts of light depending on the individual elements of the array can be compensated with the correction control based on those light-amount characteristics. Accordingly, the light-emitting element array can be suitably applied to exposure units for use with the electrophotographic process.

Figure 7:
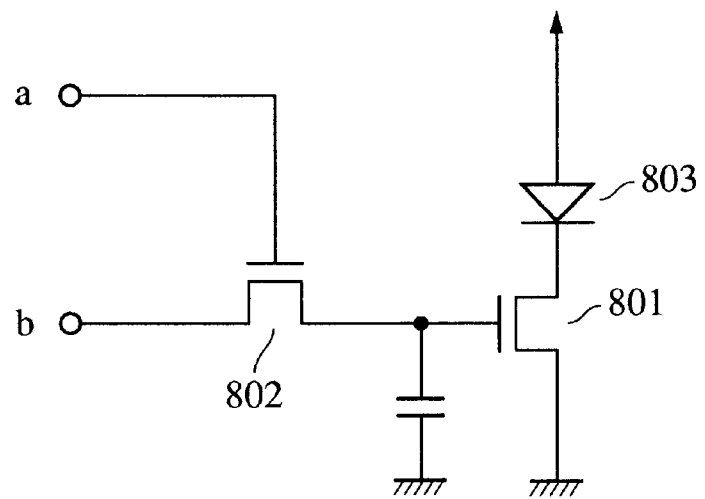
FIG. 7 is a circuit diagram of another example of the driver for driving the light-emitting elements, showing a second embodiment of the present invention.
Figure 8:
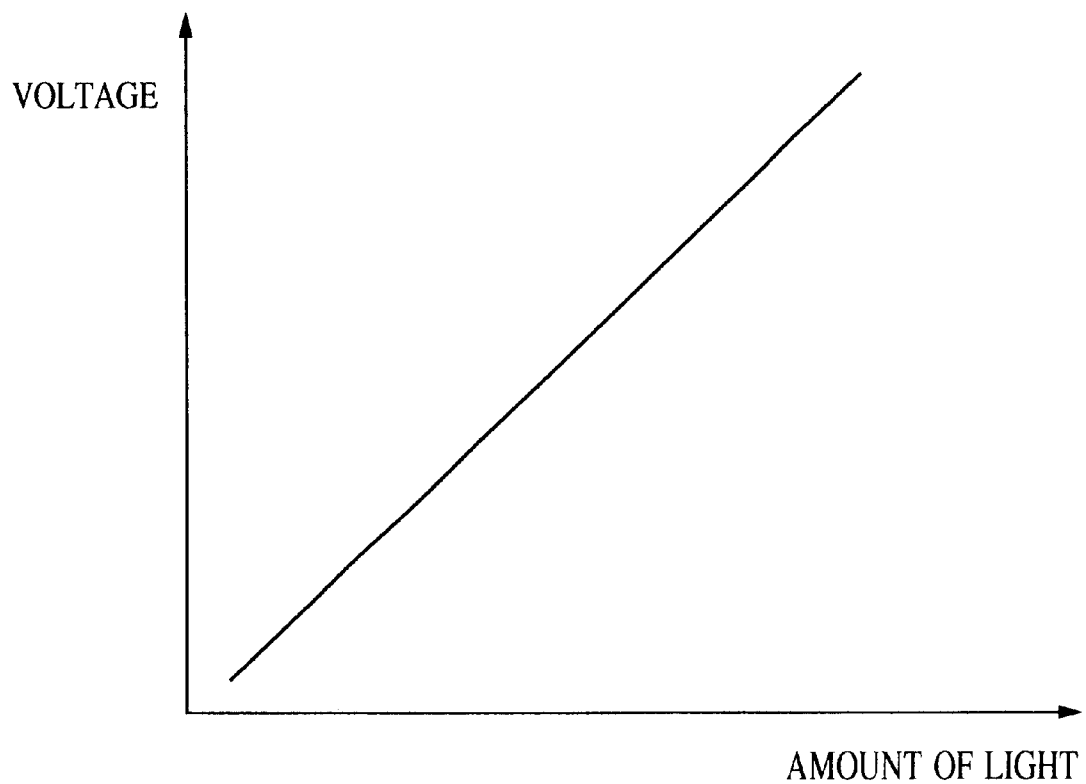
FIG. 8 is a graph showing the correlation between the driving voltage supplied from the driver in FIG. 7 and the amount of light.

FIGS. 7 and 8 illustrate a second embodiment of the present invention. FIG. 7 is a circuit diagram of another example of the driver for driving the light-emitting elements, and FIG. 8 is a graph showing the correlation between the driving voltage supplied from the driver in FIG. 7 and the amount of light.

This second embodiment differs from the above first embodiment in that, in the exposure device shown in FIG. 1, the driver for the light-emitting element array is constructed of thin film transistors (TFTs). The entire construction of an exposure device is the same as that of the above-described first embodiment (FIG. 1), and therefore is not illustrated and described here.

In this second embodiment, as shown in FIG. 7, thin film transistors 801, 802 cooperating to serve as the driver are associated with each light-emitting element 803 of the light-emitting element array. In the illustrated construction, a drain of the thin film transistor 801 is connected to the cathode side of the light-emitting element 803, and a source of the thin film transistor 802 is connected to a gate of the thin film transistor 801.

Accordingly, when a predetermined voltage is applied to a gate a of the thin film transistor 802, the thin film transistor 802 is brought into an active state, whereupon the light-emitting element 803 is selected. Thus, the gate a serves as a selection terminal. When the voltage applied to a drain b of the thin film transistor 802 is increased and decreased in the above state in which the light-emitting element 803 is selected, the voltage applied to the cathode side of the light-emitting element 803 is also increased and decreased correspondingly. The light-amount characteristics of the light-emitting element 803 exhibit such positive correlation that light emission output (i.e., the amount of light) is increased with an increase of the applied voltage, as shown in FIG. 8. Thus, the amount of light emitted from the light-emitting element 803 can be controlled to increase and decrease in accordance with the magnitude of the driving voltage applied to the drain b.

With the second embodiment, since the driver is constructed using the thin film transistors 801 and 802, the exposure device can be reduced in both size and weight.

Figure 9:
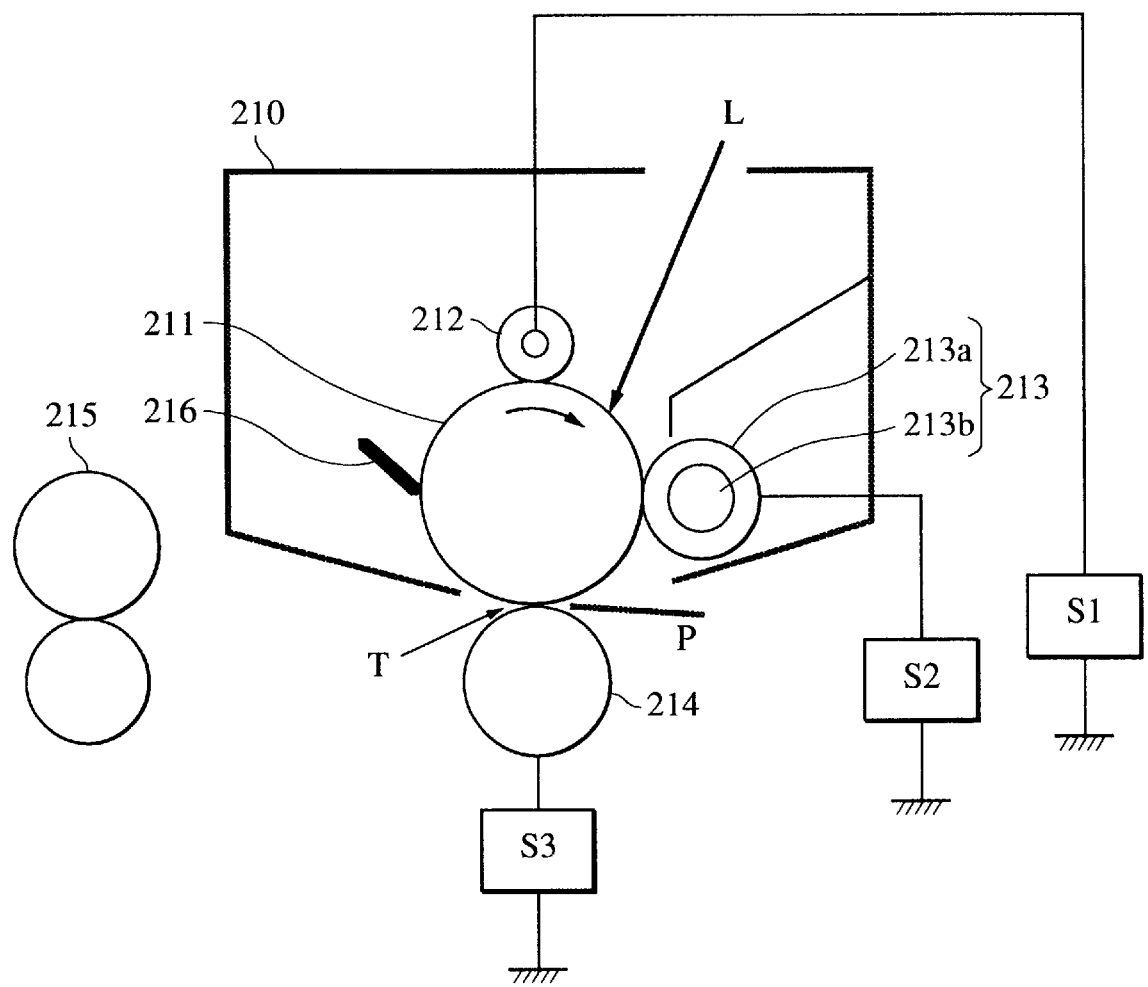
FIG. 9 is a schematic view showing one example of an image forming parties of the present invention.

FIG. 9 schematically shows the construction of an image forming apparatus utilizing the electrophotographic process, as one example of the image forming apparatus of the present invention.

Numeral 211 denotes an electrophotographic photoconductive member in the form of a rotary drum which serves an image carrier, 212 denotes a charging means, 213 denotes a developing means, 214 denotes a transferring means, 215 denotes a fusing means, and 216 denotes a cleaning means.

An exposure light L is irradiated from the exposure device (not shown) of the present invention. The driver is connected to the exposure device for applying a DC voltage to the light-emitting element array with the anode layer being positive (plus) and the cathode layer being negative (minus). Upon application of the DC voltage, green light is emitted from the light-emitting elements and is focused on the photoconductive member 211. A good image can be thus formed on the photoconductive member 211.

The photoconductive member 211 is uniformly charged by the charging means 212. The exposure light L from the exposure device is irradiated onto the charged surface of the photoconductive member 211 corresponding to a time-serial electric digital pixel signal outputted in accordance with objective image information, whereupon an electrostatic latent image corresponding to the objective image information is formed on the circumferential surface of the photoconductive member 211. The electrostatic latent image is developed into a toner image by the developing means 213 using an insulating toner. On the other hand, a transfer material P is supplied as a recording material from a paper feeder (not shown), and is introduced at the predetermined timing to a pressure contact nip area (transfer area) T defined between the photoconductive member 211 and a contact transfer means which is brought into contact with the photoconductive member 211 under predetermined pressing force. The toner image is transferred onto the transfer material P by applying a predetermined transfer bias voltage to the transferring means.

The transfer material P including the toner image transferred onto the same is separated from the surface of the photoconductive member 211, and is introduced to the fusing means 215 of the thermal fusing or any other suitable type in which the toner image is permanently fixed. After that, the transfer material P is ejected as an image formed material (print) out of the image forming apparatus. The photoconductive member 211, from which the toner image has been transferred onto the transfer material P, advances to the cleaning means 216 which removes deposited contaminants such as the remaining toner from the surface of the photoconductive member 211. The cleaned surface of the photoconductive member 211 is then employed for forming an image thereon in a repeated next cycle.

Figure 10:
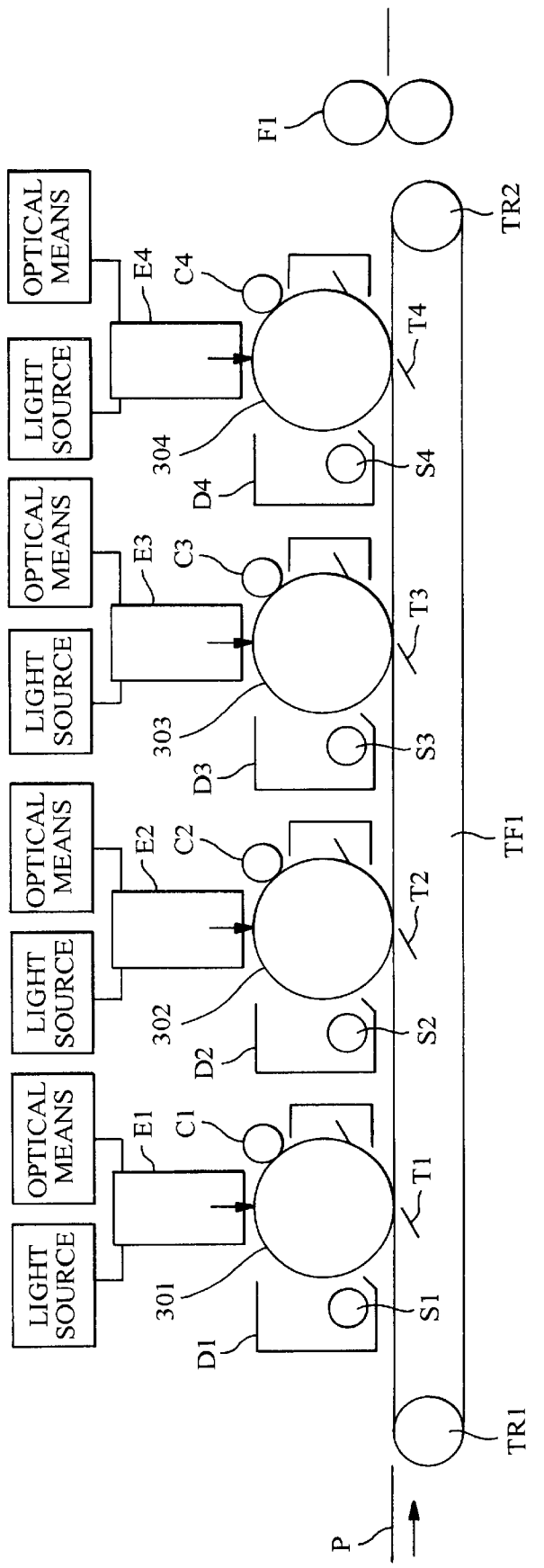
FIG. 10 is a schematic view showing another example of an image forming apparatus of the present invention.

FIG. 10 schematically shows the construction of a multicolor image forming apparatus utilizing the electrophotographic process, as one example of the image forming apparatus of the present invention.

Symbols C1–C4 denote charging means, D1–D4 denote developing means, E1–E4 denote exposure devices of the present invention, S1–S4 denote developing sleeves, T1–T4 denote transferring blades, TR1–TR2 denote rollers, TF1 denotes a transferring belt, P denotes a sheet of transfer paper, F1 denotes a fuser, and 301–304 denote electrophotographic photoconductive members in the form of rotary drums.

The transfer paper P is advanced in the direction of arrow and is introduced onto the transferring belt TF1 extended between the rollers TR1 and TR2 to be entrained therewith. The transfer paper P on the transferring belt TF1 is moved to a black transfer position set as a nip area between the photoconductive member 301 and the transferring blade T1. At this time, a desired black toner image is already formed on the surface of the photoconductive member 301 with the electrophotographic process using the charging means C1, the exposure device E1, and the developing sleeve S1 of the developing means D1 which are arranged around the drum circumference of the photoconductive member 301. Thus, the black toner image is transferred onto the transfer paper P.

The transfer paper P is then moved along with the transferring belt TF1 to a cyan transfer position set as a nip area between the photoconductive member 302 and the transferring blade T2, to a magenta transfer position set as a nip area between the photoconductive member 303 and the transferring blade T3, and to a yellow transfer position set as a nip area between the photoconductive member 304 and the transferring blade T4 successively. At those transfer positions, a cyan toner image, a magenta toner image, and a yellow toner image are transferred respectively in a similar manner as in the black transfer position.

On that occasion, since the photoconductive members 301–303 are rotated with high accuracy, the toner images can be superimposed with good registration in the respective transferring (recording) steps. The transfer paper P including an image formed thereon by multicolor recording through the above-described process is supplied to the fuser F1 for permanent fixing, whereby a desired multicolor image can be obtained.

Because of such a multicolor image forming apparatus including a plurality of electrophotographic processes, the problems experienced in conventional exposure devices, i.e., unevenness in exposure due to variations in the amounts of light emitted from the light-emitting elements and a deterioration of image quality resulted from unevenness in density of the formed image, occur in a multiple and multiplex way. However, since the exposure devices E1–E4 of the present invention are employed, all the light-emitting elements of the light-emitting element array in each exposure device emit light in a uniform amount, and variations in lowering of the amounts of light caused by temperature changes can be prevented. Further, the amounts of light emitted from the light-emitting elements can be also held at the same level for all the plurality of exposure devices E1–E4. As a result, it is possible to achieve uniform exposure for all the exposure devices, and to obtain a high-quality multicolor image free from unevenness in both density and color.

Preferably, each exposure device used in the image forming apparatus of the present invention includes an optical device, such as a microlens array, for directing the light from the light-emitting elements toward the photoconductive member more efficiently.

According to the present invention, as described above, the number of light emissions from each light-emitting element of the light-emitting element array is stored in a memory means, and a control means performs correction control for each light-emitting element based on the stored data so that the amount of light emitted from each light-emitting element is held constant. Therefore, changes in the amount of light caused by temperature changes depending on successive light emissions can be compensated. Consequently, the light-emitting element array can be suitably applied to exposure units for use with the electrophotographic process.

Also, according to the present invention, the total light-emitting time of each light-emitting element of the light-emitting element array is stored in a memory means, and a control means performs correction control for each light-emitting element based on the stored data so that the amount of light emitted from each light-emitting element is held constant. Therefore, time-dependent changes in the amount of light can be compensated. Consequently, the light-emitting element array can be suitably applied to exposure units for use with the electrophotographic process.

What is claimed is:

1. A light-emitting device, comprising:

a light-emitting element array formed by arranging a plurality of light-emitting elements;

driving means for driving said light-emitting element array to emit an amount of light from each of said light-emitting elements;

memory means for storing the number of light emissions for each light-emitting element of said light-emitting element array and a light-amount change pattern due to temperature changes of each light-emitting element; and control means for controlling said driving means based on the information stored in said memory means so that the amount of light emitted from each light-emitting element is held constant, wherein the temperature changes of each light-emitting element are increased incidental to light-emissions from adjacent elements and are stored in said memory means.

2. A light-emitting device according to claim 1, wherein said driving means includes means for applying a pulse to each light-emitting element independently, and said control means includes means for controlling said driving means so that a pulse having a pulse width corrected in accordance with the stored information is applied to each light-emitting element.

3. A light-emitting device according to claim 1, wherein said driving means includes means for applying a current having a predetermined current value to each light-emitting element independently, and said control means includes means for controlling said driving means so that a current having a current value corrected in accordance with the stored information is applied to each light-emitting element.

4. A light-emitting device according to claim 1, wherein said driving means includes means for applying a voltage having a predetermined peak value to each light-emitting element independently, and said control means includes means for controlling said driving means so that a voltage having a peak value corrected in accordance with the stored information is applied to each light-emitting element.

5. A light-emitting device according to claim 1, wherein said light-emitting elements comprise at least an anode layer, a cathode layer, and one or more organic compound layers held between said anode layer and said cathode layer, all of these three layers being stacked on a base plate.

6. A light-emitting according to claim 1, wherein said light-emitting elements include an organic layer and electrode layers having predetermined patterns from front and back surfaces.

7. An exposure device, comprising:

a light-emitting element array formed by arranging a plurality of light-emitting elements;

driving means for driving said light-emitting element array to emit an amount of light from each of said light-emitting elements;

memory means for storing the number of light emissions for each light-emitting element of said light-emitting element array and a light-amount change pattern due to temperature changes of each light-emitting element;

control means for controlling said driving means based on the information stored in said memory means so that the amount of light emitted from each light-emitting element is held constant; and means for irradiating light onto a photoconductive member, wherein the temperature changes of each light-emitting element are increased incidental to light-emissions from adjacent elements and are stored in said memory means.

8. An exposure device according to claim 7, wherein said means for irradiating light onto a photoconductive member includes optical means.

9. An exposure device according to claim 7, wherein said light-emitting elements include an organic layer having predetermined patterns from front and back surfaces.

10. An image forming apparatus, comprising:

(a) a photoconductive member; and (b) a light-emitting device comprising:

a light-emitting element array formed by arranging a plurality of light-emitting elements;

driving means for driving said light-emitting element array to emit an amount of light from each of said light-emitting elements;

memory means for storing the number of light emissions for each light-emitting element of said light-emitting element array and a light-amount change pattern due to temperature changes of each light-emitting element; and control means for controlling said driving means based on the information stored in said memory means so that the amount of light emitted from each light-emitting element is held constant, wherein the temperature changes of each light-emitting element are increased incidental to light-emissions from adjacent elements and are stored in said memory means.

11. An image forming apparatus according to claim 10, wherein said photoconductive member is an electrophotographic photoconductive member.

12. An image forming apparatus according to claim 11, wherein said electrophotographic photoconductive member is an electrophotographic photoconductive member in the form of a rotary drum.

13. An image forming apparatus according to claim 10, further comprising a charging device, a developing device, and a transferring device.

14. An image forming apparatus according to claim 10, wherein said light-emitting elements include an organic layer and electrode layers having predetermined patterns from front and back surfaces.

15. A light-emitting device, comprising;

a light-emitting element array formed by arranging a plurality of light-emitting elements, with said light-emitting elements having an organic layer and electrode layers having predetermined patterns from front and back surfaces;

driving means for driving said light-emitting element array to emit an amount of light from each of said light-emitting elements;

memory means for storing a total light-emitting time for each light-emitting element of said light-emitting element array and a light-amount change pattern due to temperature changes of each light-emitting element; and control means for controlling said driving means based on the information stored in said memory means so that the amount of light emitted from each light-emitting element is held constant, wherein the temperature changes of each light-emitting element are increased incidental to light-emissions from adjacent elements and are stored in said memory means.

16. A light-emitting device according to claim 15, wherein said driving means includes means for applying a pulse to each light-emitting element independently, and said control means includes means for controlling said driving means so that a pulse having a pulse width corrected in accordance with the stored information is applied to each light-emitting element.

17. A light-emitting device according to claim 15, wherein said driving means includes means for applying a current having a predetermined current value to each light-emitting element independently, and said control means includes means for controlling said driving means so that a current having a current value corrected in accordance with the stored information is applied to each light-emitting element.

18. A light-emitting device according to claim 15, wherein said driving means includes means for applying a voltage having a predetermined peak value to each light-emitting element independently, and said control means includes means for controlling said driving means so that a voltage having a peak value corrected in accordance with the stored information is applied to each light-emitting element.

19. A light-emitting device according to claim 15, wherein said light-emitting elements are comprised of at least an anode layer, a cathode layer, and one or more organic compound layers held between said anode layer and said cathode layer, all of these three layers being stacked on a base plate.

20. An exposure device, comprising:
   a light-emitting element array formed by arranging a plurality of light-emitting elements, said light-emitting elements having an organic layer and electrode layers having predetermined patterns from front and back surfaces;
   driving means for driving said light-emitting element array to emit an amount of light from each of said light-emitting elements;
   memory means for storing a total light-emitting time for each light-emitting element of said light-emitting element array and a light-amount change pattern due to temperature changes of each light-emitting element;
   control means for controlling said driving means based on the information stored in said memory means so that the amount of light emitted from each light-emitting element is held constant; and
   means for irradiating light onto a photoconductive member, wherein
      the temperature changes of each light-emitting element are increased incidental to light-emissions from adjacent elements and are stored in said memory means.

21. An exposure device according to claim 20, wherein said means for irradiating light onto a photoconductive member includes optical means.

22. An image forming apparatus, comprising:
   (a) a photoconductive member; and
   (b) a light-emitting device comprising:
      a light-emitting element array formed by arranging a plurality of light-emitting elements, said light-emitting elements have an organic layer and electrode layers having predetermined patterns from front and back surfaces;
      driving means for driving said light-emitting element array to emit an amount of light from each of said light-emitting elements;
      memory means for storing a total light-emitting time for each light-emitting element of said light-emitting element array and a light-amount change pattern due to temperature changes of each light-emitting element; and
      control means for controlling said driving means based on the information stored in said memory means so that the amount of light emitted from each light-emitting element is held constant, wherein
         the temperature changes of each light-emitting element are increased incidental to light-emissions from adjacent elements and are stored in said memory means.

23. An image forming apparatus according to claim 22, wherein said photoconductive member is an electrophotographic photoconductive member.

24. An image forming apparatus according to claim 23, wherein said electrophotographic photoconductive member is an electrophotographic photoconductive member in the form of a rotary drum.

25. An image forming apparatus according to claim 22, further comprising a charging device, a developing device, and a transferring device.

26. A light-emitting device, comprising:
   a light-emitting element array formed by arranging a plurality of light-emitting elements;
   a driver that causes said light-emitting element array to emit an amount of light from each of said light-emitting elements;
   a memory device that stores the number of light emissions for each light-emitting element of said light-emitting element array and a light-amount change pattern due to temperature changes of each light-emitting element; and
   a controller that controls said driver based on the information stored in said memory device so that the amount of light emitted from each light-emitting element is held constant, wherein
      the temperature changes of each light-emitting element are increased incidental to light-emissions from adjacent elements and are stored in said memory device.

27. A light-emitting device according to claim 26, wherein said light-emitting elements have an organic layer and electrode layers having predetermined patterns from front and back surfaces.

28. A light-emitting device, comprising:
   a light-emitting element array formed by arranging a plurality of light-emitting elements, said light-emitting elements having an organic layer and electrode layers having predetermined patterns from front and back surfaces;
   a driver that causes said light-emitting element array to emit an amount of light from each of said light-emitting elements;
   a memory device that stores a total light-emitting time for each light-emitting element of said light-emitting element array and a light-amount change pattern due to temperature changes of each light-emitting element; and
   a controller that controls said driver based on the information stored in said memory device so that the amount of light emitted from each light-emitting element is held constant, wherein
      the temperature changes of each light-emitting element are increased incidental to light-emissions from adjacent elements and are stored in said memory device.

* * * * *

UNITED STATES PATENT AND TRADEMARK OFFICE
CERTIFICATE OF CORRECTION

PATENT NO.    : 6,504,565 B1
DATED         : January 7, 2003
INVENTOR(S)   : Izumi Narita et al.

It is certified that error appears in the above-identified patent and that said Letters Patent is hereby corrected as shown below:

Column 2,
Line 15, "and" should be deleted.

Column 3,
Line 5, "parties" should read -- apparatus --.

Column 6,
Line 4,  " 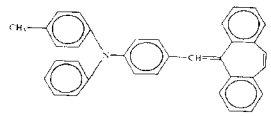 " should read -- 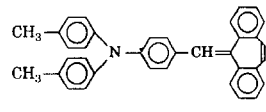 --

Column 9,
Line 1,  " 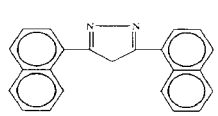 " should read -- 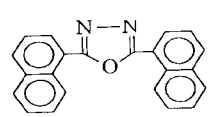 --

Signed and Sealed this

Second Day of December, 2003

JAMES E. ROGAN
*Director of the United States Patent and Trademark Office*